United States Patent
Wang et al.

(10) Patent No.: US 9,218,524 B2
(45) Date of Patent: Dec. 22, 2015

(54) AUTOMATIC SPATIAL CONTEXT BASED MULTI-OBJECT SEGMENTATION IN 3D IMAGES

(71) Applicants: Quan Wang, Troy, NY (US); Dijia Wu, North Brunswick, NJ (US); Meizhu Liu, Plainsboro, NJ (US); Le Lu, Chalfont, PA (US); Kevin Shaohua Zhou, Plainsboro, NJ (US)

(72) Inventors: Quan Wang, Troy, NY (US); Dijia Wu, North Brunswick, NJ (US); Meizhu Liu, Plainsboro, NJ (US); Le Lu, Chalfont, PA (US); Kevin Shaohua Zhou, Plainsboro, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 144 days.

(21) Appl. No.: 13/776,184

(22) Filed: Feb. 25, 2013

(65) Prior Publication Data
US 2014/0161334 A1 Jun. 12, 2014

Related U.S. Application Data

(60) Provisional application No. 61/734,280, filed on Dec. 6, 2012.

(51) Int. Cl.
| | | |
|---|---|---|
| G06K 9/00 | (2006.01) | |
| G06T 7/00 | (2006.01) | |
| G06K 9/62 | (2006.01) | |

(52) U.S. Cl.
CPC .......... *G06K 9/00362* (2013.01); *G06K 9/6219* (2013.01); *G06K 9/6282* (2013.01); *G06T 7/0083* (2013.01); *G06T 7/0089* (2013.01); *G06K 2209/055* (2013.01); *G06T 2207/10088* (2013.01); *G06T 2207/30008* (2013.01)

(58) Field of Classification Search
None
See application file for complete search history.

(56) References Cited

U.S. PATENT DOCUMENTS

| | | | |
|---|---|---|---|
| 7,239,908 B1* | 7/2007 | Alexander et al. | 600/427 |
| 2006/0056698 A1* | 3/2006 | Jolly | G06K 9/6209 382/190 |
| 2008/0075375 A1* | 3/2008 | Unal | G06K 9/621 382/243 |
| 2010/0220907 A1* | 9/2010 | Dam et al. | 382/131 |
| 2010/0316288 A1* | 12/2010 | Ip et al. | 382/164 |
| 2011/0243416 A1* | 10/2011 | Gregory et al. | 382/131 |
| 2011/0295378 A1* | 12/2011 | Bojarski et al. | 623/20.35 |

(Continued)

OTHER PUBLICATIONS

A Fully Automated Segmentation of Knee Bones and Cartilage Using Shape Context and Active Shape Models; Behnaz Pirzamanbin, May 16, 2012.*

(Continued)

*Primary Examiner* — Stephen R Koziol
*Assistant Examiner* — Pinalben Patel

(57) ABSTRACT

Methods and systems for automatic classification of images of internal structures of human and animal bodies. A method includes receiving a magnetic resonance (MR) image testing model and determining a testing volume of the testing model that includes areas of the testing model to be classified as bone or cartilage. The method includes modifying the testing model so that the testing volume corresponds to a mean shape and a shape variation space of an active shape model and producing an initial classification of the testing volume by fitting the testing volume to the mean shape and the shape variation space. The method includes producing a refined classification of the testing volume into bone areas and cartilage areas by refining the boundaries of the testing volume with respect to the active shape model and segmenting the MR image testing model into different areas corresponding to bone areas and cartilage areas.

22 Claims, 5 Drawing Sheets

(56) References Cited

U.S. PATENT DOCUMENTS

| | | | |
|---|---|---|---|
| 2012/0207377 A1* | 8/2012 | Gupta et al. | 382/134 |
| 2013/0022253 A1* | 1/2013 | Lee et al. | 382/131 |
| 2014/0163375 A1* | 6/2014 | Wasielewski | 600/443 |
| 2014/0270551 A1* | 9/2014 | Baranowski | G06K 9/6285 382/226 |
| 2015/0078640 A1* | 3/2015 | Guo | G06T 7/0083 382/131 |

OTHER PUBLICATIONS

Automatic Segmentation and Quantitative Analysis of the Articular Cartilages From Magnetic Resonance Images of the Knee, Jurgen Fripp, IEEE Transactions on Medical Imaging, Voi. 29, No. 1, Jan. 2010.*

Point Set Registration: Coherent Point Drift, Andriy Myronenko, May 15, 2009, Department of Science and Engineering, School of Medicine, Oregan Health and Science University, Portland, OR, 97201.*

Decision Forests with Long-Range Spatial Context for Organ Localization in CT Volumes, A. Criminisi, Microsoft Research Ltd, Cambridge, UK.*

Four-Chamber Heart Modeling and Automatic Segmentation for 3D Cardiac CT Volumes Using Marginal Space Learning and Steerable Features, Yefeng Zheng, IEE Transactions on Medical Imaging.*

Yan, IEEE Transactions on Medical Imaging, vol. 29, No. 12, 2010, LOGISMOS-Layered Optimal Graph Image Segmentation of Multiple Objects and Surfaces: Cartilage Segmentation in the Knee Joint.*

Guo, IEEE 17th International Conference on Image Processing, Sep. 2010, A Two Pass Random Forest Classification of Airborne Lidar and Image Data on Urban Scenes.*

Quan Wang et al.: "Semantic Context Forests for Learning-Based Knee Cartilage Segmentation in 3D MR Images", Jul. 10, 2013, Retrieved from Internet: URL: http://arxiv.org/abs/1307.2965 (retrieved on Feb. 5, 2014). (10 pages).

Jurgen Fripp et al.: "Automatic segmentation of the bone and extraction of the bone-cartilage interface from magnetic resonance images of the knee; Automatic extraction of the bone--cartilage interface from MRIs of the knee", Physics in Medicine and Biology, Institute of Physics Publishing, Bristol GB, vol. 52, No. 6, Mar. 21, 2007. (16 pages).

Bharath Ramakrishna et al.: "A Concurrent Computer Aided Detection CAD Tool for Articular Cartilage Disease of the Knee on MR Imaging Using Active Shape Models", Proceedings of the SPIE—The International Society for Optical Engineering USA, vol. 6915. Mar. 6, 2008. (10 pages).

Yen-Wei Chen et al.: "Statistical Atlases of Human Anatomy and Computer Assisted Diagnostic System", Software Engineering and Data Mining (SEDM), 2010 2nd International Conference, IEEE, Piscatawy, NJ, USA Jun. 23, 2010. (6 pages).

Yefeng Zheng et al.: "Marginal Space Learning for Efficient Detection of 2D/3D Anatomical Structures in Medical Images", Jul. 5, 2009, Information Processing in Medical Imaging, Springer Berlin Heidelberg, Berlin, Heidelberg. (12 Page).

Jurgen Fripp et al.: "Automatic Segmentation and Quantitative Analysis of the Articular Cartilages from Magnetic Resonance Images of the Knee", IEEE Transactions on Medical Imaging, IEEE Service Center, Piscataway, NJ, US, vol. 29, No. 1, Jan. 1, 2010. (10 pages).

Results of Partial International Search dated Feb. 17, 2014, for PCT Application No. PCT/US2013/073614. (5 pages).

T. F. Coates et al., "Active Shape Models—Their Training and Application" Department of Medical Biophysics, University of Manchester, Manchester, England Jul. 29, 1992, Academic Press, Inc., pp. 38-59.

Y Boykov et al., "Fast Approximate Energy Minimization via Graph Cuts" IEEE Transactions on Pattern Analysis and Machine Intelligence, vol. 23, No. 11, Nov. 2001, pp. 1222-1239.

Yefeng Zheng, et al., "Four-Chamber Heart Modeling and Automatic Segmentation for 3-D Cardiac CT Volumes Using Marginal Space Learning and Steerable Features" IEEE Transactions on Medical Imaging, vol. 27, No. 11, Nov. 2008, pp. 1668-1681.

A Myronenko, et al., "Point Set Registration: Coherent Point Drift" IEEE Transactions on Pattern Analysis and Machine Intelligence, vol. 32, No. 12, Dec. 2010, pp. 2262-2275.

Wikipedia, the free encyclopedia, "Random Forest", http://en.wikipedia.org/wiki/Random_forest, 4 pages, last modified on Feb. 8, 2013 at 09:46.

Leo Grady, "Random Walks for Image Segmentation" IEEE Transactions on Pattern Analysis and Machine Intelligence, vol. 28, No. 11, Nov. 2006, pp. 1-17.

Leo Breiman, "Random Forests", Statistics Department, University of California, Machine Learning, 45, 5-32, 2001, Kluwer Academic Publishers, Netherlands pp. 5-32.

* cited by examiner

AUTOMATIC SPATIAL CONTEXT BASED MULTI-OBJECT SEGMENTATION IN 3D IMAGES

CROSS-REFERENCE TO RELATED APPLICATION

This application claims the benefit of the filing date of U.S. Provisional Patent Application 61/734,280, filed Dec. 6, 2012, which is hereby incorporated by reference.

TECHNICAL FIELD

The present disclosure is directed, in general, to computer-aided imaging and image analysis systems, and similar systems, including but not limited to magnetic resonance imaging (MRI), nuclear magnetic resonance imaging (NMRI), and magnetic resonance tomography (MRT) systems (collectively and non-exclusively, "imaging systems").

BACKGROUND OF THE DISCLOSURE

Imaging systems can produce, store, manipulate, and analyze images, including images of internal structures of human and animal bodies. Improved systems are desirable.

SUMMARY OF THE DISCLOSURE

Various disclosed embodiments include methods and systems for automatic classification of images of internal structures of human and animal bodies. A method includes receiving magnetic resonance (MR) image testing model and determining a testing volume of the testing model that includes areas of the testing model to be classified as bone or cartilage. The method includes modifying the testing model so that the testing volume corresponds to a mean shape and a shape variation space of an active shape model and producing an initial classification of the testing volume by fitting the testing volume to the mean shape and the shape variation space. The method includes producing a refined classification of the testing volume into bone areas and cartilage areas by refining the boundaries of the testing volume with respect to the active shape model. The method can include storing the refined classification as classification data associated with the MR image testing model. The method includes segmenting the MR image testing model into different areas corresponding to bone areas and cartilage areas according to the refined classification.

Another method for classifying bone and cartilage in a magnetic resonance image includes receiving an MR image testing model, the testing model including unclassified bone and cartilage portions represented by a plurality of voxels. The method includes performing a first classification process, by the data processing system, using first pass random forest classifiers to produce a first pass probability map that classifies each voxel of the testing model as one of femoral cartilage, tibial cartilage, patellar cartilage, or background. The method includes performing a second classification process, by the data processing system, using second pass random forest classifiers to produce a second pass probability map that classifies each voxel of the first pass probability map as one of femoral cartilage, tibial cartilage, patellar cartilage, or background. The method includes storing classification data in the data processing system, corresponding to the second pass probability map, as associated with the MR image testing model. The method includes displaying the MR image testing model including indicating portions of the MR image testing model corresponding to the classification of each voxel.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
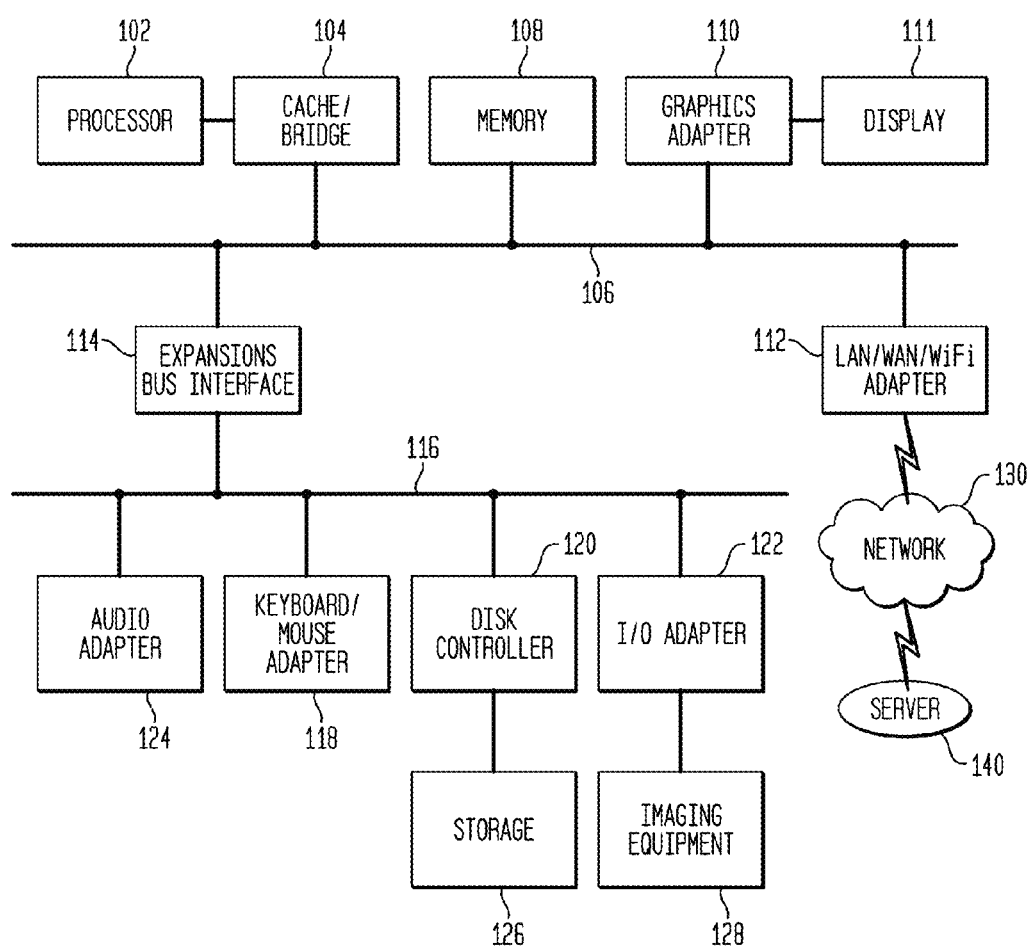
FIG. 1 illustrates a block diagram of a data processing system in which an embodiment can be implemented.

FIGS. 1 through 6 and the various embodiments used to describe the principles of the present disclosure in this patent document are by way of illustration only and should not be construed in any way to limit the scope of the disclosure.

Those skilled in the art will understand that the principles of the present disclosure may be implemented in any suitably arranged device. The numerous innovative teachings of the present application will be described with reference to exemplary non-limiting embodiments.

Disclosed embodiments include improved imaging systems and methods for recognizing, analyzing, and classifying images and the elements represented by the images, including but not limited to imaging systems and methods for classifying and "segmenting" cartilage structures in the human knee and in other human and animal images. While specific embodiments are described below in terms of human knee structures, those of skill in the art will recognize that the techniques and embodiments illustrated herein can be applied to other anatomical images such as of the hip, elbow, shoulder, wrist, and others, and can be applied to other images including but not limited to bone/cartilage images such as CT scans and other 2D and 3D images.

The automatic segmentation of human knee cartilage from 3D MR images is a useful yet challenging task due to the thin sheet structure of the cartilage with diffuse boundaries and inhomogeneous intensities.

Disclosed embodiments include an iterative multi-class learning method to segment the femoral, tibial, and patellar cartilage simultaneously, and can effectively exploit the spatial contextual constraints between bone and cartilage and also between different cartilages.

Based on the fact that the cartilage grows in only certain areas of the corresponding bone surface, the system can extract the distance features of not only the distance to the surface of the bone, but more informatively, of the distance to the densely registered anatomical landmarks on the bone surface.

The system can also or alternatively use a set of iterative discriminative classifiers such that, at each iteration, probability comparison features are constructed from the class confidence maps derived by previously learned classifiers. These features automatically embed the semantic context information between different cartilages of interest.

Disclosed embodiments include a fully automatic, highly accurate and robust segmentation method for knee cartilage in 3D MR images. This method is learning-based and effectively exploits the spatial constraints between the bone and cartilage, as well as the constraints between different cartilages. In particular, the distance features from a large number of anatomical landmarks densely registered on the surface of the corresponding bones, as well as the iterative discriminative classification with probability comparison features are new and unique compared to the prior art in this field.

Although motivated by the problem of cartilage segmentation in MRI images, the proposed method can be applied to general segmentation problems of different objects in medical and other images of different modalities (including but not limited to such areas as ground penetrating radar, X-Ray imaging of structures, parcels, and containers, millimeter-wave imaging, and others) to effectively exploit the spatial semantic information and contextual constraints for boosting the segmentation performance.

Cartilages are not clearly visible as MRI images in general. However, the spatial contextual constraints between bones and cartilages, which are learned by the disclosed method, can be used to construct statistic models of the bones and cartilages jointly. Accordingly, it can be more accurate than estimating the cartilages with such prior models based on the bones, which can be more easily segmented from the CT images. After segmentation or classification as described herein, the classification data and segmented images can be merged with CT, X-Ray, or other images for a more comprehensive view of the subject area.

FIG. 1 illustrates a block diagram of a data processing system in which an embodiment can be implemented, for example, as an imaging system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus 106 in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example illustrated is audio adapter 124, to which speakers (not shown) may be connected for playing sounds. Keyboard/mouse adapter 118 provides a connection for a pointing device (not shown), such as a mouse, trackball, trackpointer, etc.

I/O adapter 122 can be connected, for example, to imaging equipment 128, which can include any known imaging system hardware configured to perform processes as described herein, and can specifically include MRI, NMRI, and MRT equipment as known to those of skill in the art, as well as other imaging equipment.

Those of ordinary skill in the art will appreciate that the hardware illustrated in FIG. 1 may vary for particular implementations. For example, other peripheral devices, such as an optical disk drive and the like, also may be used in addition to or in place of the hardware illustrated. The illustrated example is provided for the purpose of explanation only and is not meant to imply architectural limitations with respect to the present disclosure.

A data processing system or imaging system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

MRI provides direct and noninvasive visualization of the whole knee joint including the soft cartilage tissues. In many cases, researchers are interested in segmenting the three different cartilages in the human knee joint: the femoral cartilage, the tibial cartilage, and the patellar cartilage. These cartilages are attached to the femur, tibia, and patella, respectively. Specifically, unlike the femoral cartilage and the patellar cartilage, which are one-piece structures, the tibial cartilage consists of two separated pieces: the lateral tibial cartilage and the medial tibial cartilage.

Since knee cartilages are very thin structures and are attached to specific surface locations of the three knee bones, researchers prefer to segment the knee bones first and incorporate the prior knowledge of the bones into the cartilage segmentation procedure.

Figure 2:
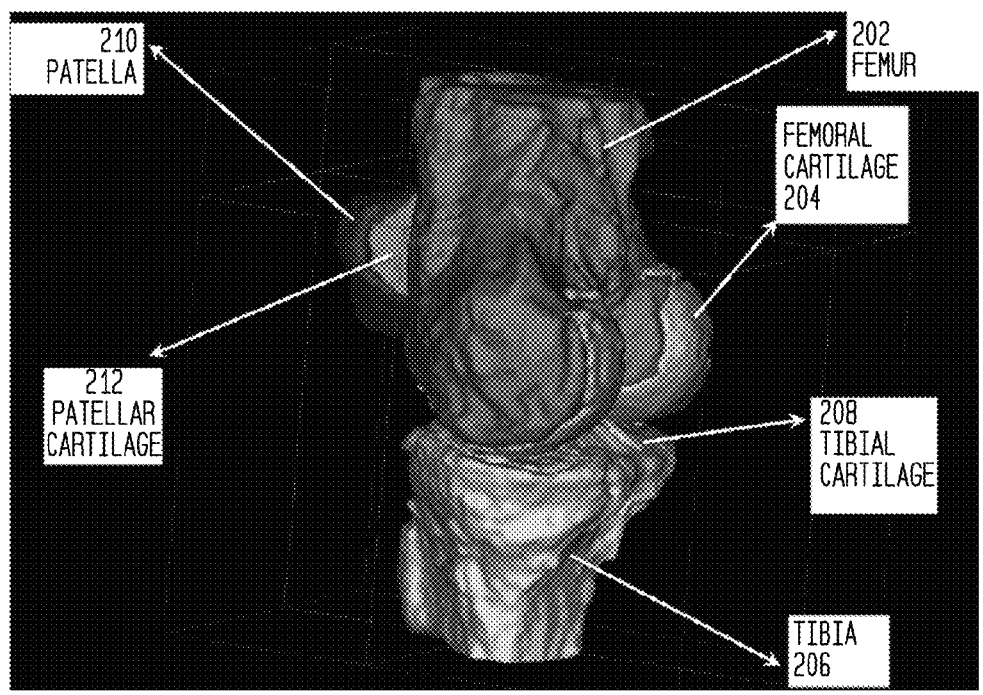
FIG. 2 illustrates an exemplary knee joint.

FIG. 2 illustrates an exemplary knee joint, including femur 202, femoral cartilage 204, tibia 206, tibial cartilage 208, patella 210, and patellar cartilage 212. Menisci and muscles are omitted from this figure for clarity.

Automatic segmentation of the cartilage tissues from MR images, which is required for accurate and reproducible quantitative cartilage measures, is difficult or impossible in current systems because of the inhomogeneity, small size, low tissue contrast, and shape irregularity of the cartilage.

Figure 3:
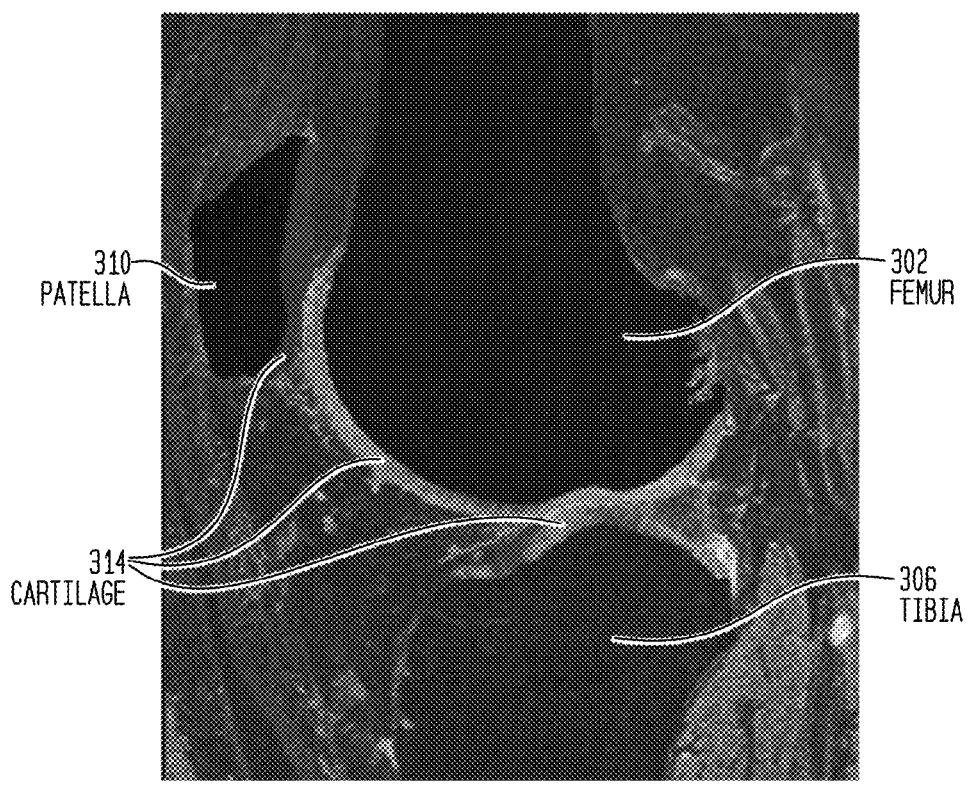
FIG. 3 illustrates a line-drawing representation of an MR image of an exemplary knee joint.

FIG. 3 illustrates a line-drawing representation of an MR image of an exemplary knee joint, including femur 302, tibia 306, patella 310, and areas of cartilage 314.

Disclosed embodiments include a fully automatic learning-based voxel classification method for cartilage segmentation. Disclosed techniques include pre-segmentation of corresponding bones in the knee joint, but does not rely on explicit classification of the bone-cartilage interface (BCI).

Instead, disclosed embodiments construct distance features from each voxel to a large number of anatomical landmarks on the surface of the bones to capture the spatial relation between the cartilages and bones. Since BCI extraction is not required, the whole framework is simplified and classification error propagation can be avoided. Disclosed embodiments can construct multi-pass feature-boosting forests and use the distance to dense landmark features, as described in more detail below.

The forests used herein can be implemented as random forests, as known to those of skill in the art. Such a random forest, as used herein, is an ensemble classifier that consists of many decision trees and outputs the class that is the mode of the classes output by individual trees. In general, each tree is constructed using by letting the number of training cases be N and the number of variables in the classifier be M. The number m represents the number of input variables to be used to determine the decision at a node of the tree; m should be much less than M. The system chooses a training set for this tree by choosing n times with replacement from all N available training cases (i.e., take a bootstrap sample). The system uses the rest of the cases to estimate the error of the tree, by predicting their classes. For each node of the tree, the system randomly chooses m variables on which to base the decision at that node. The system calculates the best split based on these m variables in the training set. Each tree is fully "grown" and not pruned (as may be done in constructing a normal tree classifier). General discussion of such random forests can be found, at the time of filing, at en.wikipedia.org/wiki/Random_forest, and in Leo Breiman, *Random Forests*, Machine Learning 45, No. 1 (2001): 5-32, both of which are hereby incorporated by reference. For example, Breiman describes that random forests are a combination of tree predictors such that each tree depends on the values of a random vector sampled independently and with the same distribution for all trees in the forest.

Besides the connection between the cartilages and bones, strong spatial relation also exists among different cartilages, which is more often overlooked in other approaches. For example, the femoral cartilage is always above the tibial cartilage and two cartilages touch each other in the region where two bones slide over each other during joint movements.

To utilize this constraint, using auto-context techniques, disclosed embodiments implement an iterative discriminative classification so that, at each iteration, the multiclass probability maps obtained by previous classifiers are used to extract semantic context features. In particular, the system can compare the probabilities at positions with random shifts and compute the difference. These features, referred to herein as the random shift probability difference (RSPD) features, are more computationally efficient and more flexible for a different range of contexts compared to the calculation of probability statistics at fixed relative positions according to other techniques.

Joint classification and regression random forests can be used to solve multiple organ segmentation problems. Regression can be used to predict and estimate the organ boundary maps. In other methods, the output organ boundary maps are informative, but still not highly accurate based on regressed values.

Disclosed embodiments, however, attempt to segment very thin layer structured objects as cartilage, so that there is not much variation in regression values. Instead, the distance information as spatial prior are encoded for supervised classification, which is more effective to learn with high accuracy and repeatability. The spatial prior, in this context, is the prior spatial relationship between the multiple objects, more specifically between the cartilages and bones.

Figure 4:
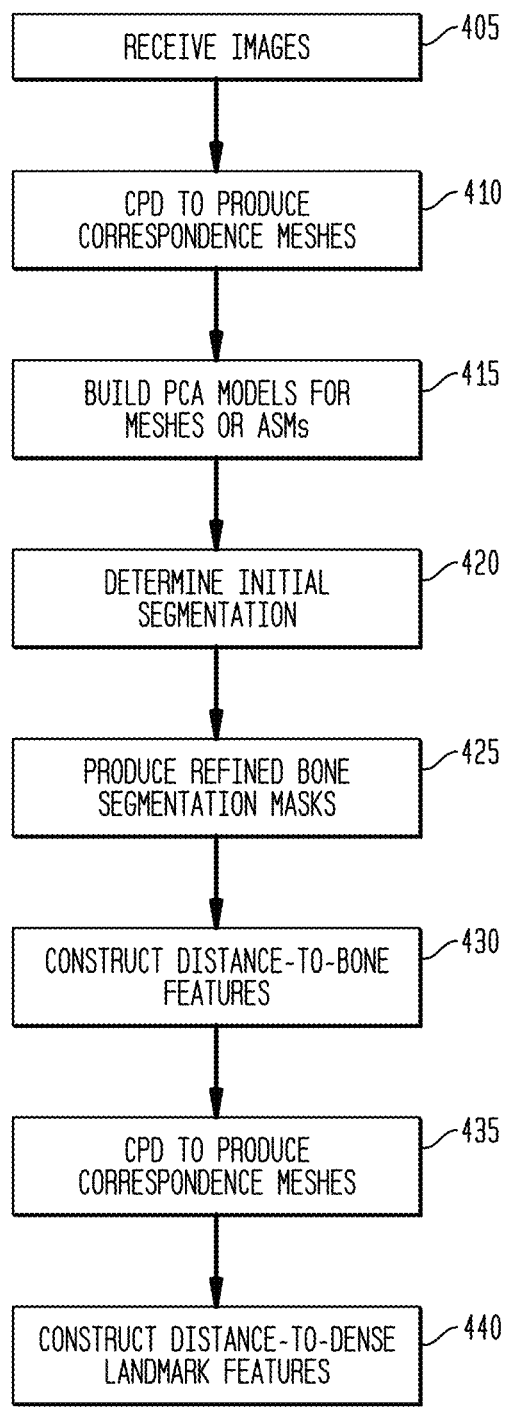
FIG. 4 illustrates a flowchart of an exemplary process for bone segmentation in accordance with disclosed embodiments.

FIG. 4 illustrates a flowchart of an exemplary process for bone segmentation performed by one or more data processing systems (individually and collectively referred to as the "system") such as described herein. Various steps described briefly with respect to this figure are described in more detail below.

In some embodiments, to segment the three knee bones in 3D MR images, the system can first receive a set of MR image training volumes with manually annotated bone structures, referred to as the "ground truth" bones or images since the classifications of bones, cartilage, and other structures is known (step 405). The system can convert the ground truth images to meshes and perform a point-set registration using the coherent point drift (CPD) method to produce correspondence meshes (step 410). In some cases, a CPD method can be used as described in A. Myronenko and X. Song, *Point Set Registration: Coherent Point Drift*, IEEE Transactions on Pattern Analysis and Machine Intelligence, 32(12):2262-2275, December 2010, hereby incorporated by reference.

For example, as described by Myronenko, point set registration is a key component in many computer vision tasks. The goal of point set registration is to assign correspondences between two sets of points and to recover the transformation that maps one point set to the other. Multiple factors, including an unknown nonrigid spatial transformation, large dimensionality of point set, noise, and outliers, can be addressed by the CPD method for both rigid and nonrigid point set registration. Such a method considers the alignment of two point sets as a probability density estimation problem and fits the Gaussian mixture model (GMM) centroids (representing the first point set) to the data (the second point set) by maximizing the likelihood. The system can force the GMM centroids to move coherently as a group to preserve the topological structure of the point sets. In the rigid case, the system can impose the coherence constraint by reparameterization of GMM centroid locations with rigid parameters and derive a closed form solution of the maximization step of the Expectation Maximization algorithm in arbitrary dimensions. In the nonrigid case, the system can impose the coherence constraint by regularizing the displacement field and using the variational calculus to derive the optimal transformation.

The system can then train and build principal component analysis (PCA) models for all the correspondence meshes (step 415). These PCA models are statistical shape models which capture the mean and variation of object shapes represented by the correspondence meshes. The PCA models are built from a set of training data/volumes and can then be applied to the testing data/volumes for the purpose of segmentation.

The system can then combine the PCA models to produce an active shape model (ASM) that includes a mean shape, which corresponds to the average shapes of the bones and cartilage of the training volumes, and a shape variation space, which corresponds to the variation in placement of the bones and cartilage of the training volumes. The system can then fit these ASMs to images to determine the initial segmentation of the three knee bones (step 420), though a segmentation by this initial fitting of ASMs is generally not accurate.

An ASM technique is described in T. Coots, C. Taylor, D. Cooper, and J. Graham, *Active Shape Models—Their Training and Application*, Computer Vision and Image Understanding, 61(1):38-59, 1995, hereby incorporated by reference. For example, Coots describes a method for building models by learning patters of variability form a training set of correctly annotated images. These ASMs can be used for image search in an iterative refinement algorithm, while only deforming the ASMs in ways consistent with the training set.

The system can then morphologically erode the mask to generate positive seeds of the bone, dilate the mask to generate negative seeds of the bone, and perform a random walks process to get refined bone segmentation masks (step 425). One suitable random walks algorithm is described in L. Grady, *Random Walks for Image Segmentation*, IEEE Transactions on Pattern Analysis and Machine Intelligence, 28(11): 1768-1783, November 2006, hereby incorporated by reference. For example, Grady describes a process that, given a small number of pixels with user-defined (or pre-defined) labels, can analytically and quickly determine the probability that a random walker starting at each unlabeled pixel will first reach one of the pre-labeled pixels. By assigning each pixel to the label for which the greatest probability is calculated, a high-quality image segmentation may be obtained. Such a process can be performed in discrete space (e.g., on a graph) using combinatorial analogues of standard operators and principles from continuous potential theory, allowing it to be applied in arbitrary dimensions on arbitrary graphs.

The system can then perform a 3D signed distance transform on the refined bone segmentation masks to construct signed distance-to-bone features (step 430). The system can then again apply a CPD process to produce correspondence meshes of segmentation results (step 435). The system uses these correspondence meshes to construct distance-to-dense landmark features (step 440).

As mentioned above, the knee bones are segmented first for two main reasons. First, the bone surfaces provide important spatial constraints for cartilage segmentation. Second, it is relatively easier to segment the bones because they have more regular and distinctive shapes.

Disclosed embodiments represent the shape of a bone by a closed triangle mesh $M=\{P,T\}$ where $P=\{p_i \in \Box^3\}_{i=1}^N$ is the set of N mesh points and $T=\{t_i \in \Box_+^3\}_{i=1}^M$, is the set of M triangle indices. Given a number of training volumes with manual bone annotations, the system can use a CPD process to find anatomical correspondences of the mesh points and thereof construct the statistical shape models with mean shape denoted as $\overline{M}$.

Figure 5:
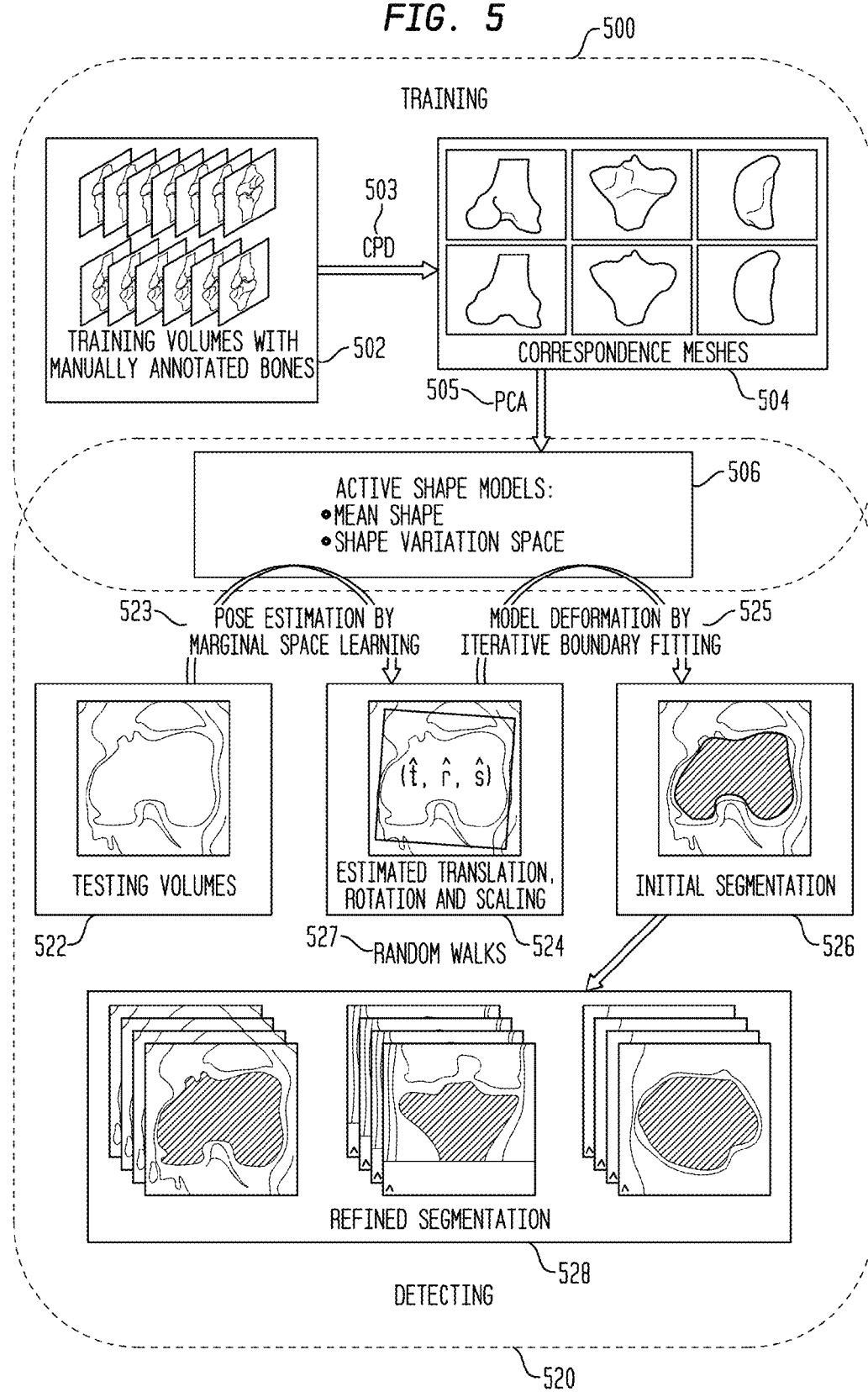
FIG. 5 illustrates a bone segmentation process in accordance with disclosed embodiments.

FIG. 5 illustrates a bone segmentation process in accordance with disclosed embodiments, that includes a training phase 500 and a detecting phase 520. The training phase 500 includes receiving training volumes with manually annotated bones or cartilage at 502 (ground truth images), performing a CPD process at 503 to produce the correspondence meshes at 504, and performing a PCA process at 505 to produce the active shape models at 506, including the mean shape and the corresponding shape variation space.

The detecting phase 500 uses the active shape models produced at 506. These are applied to each MR image to be processed (the "model" or "testing model"), which are received by the system, to determine the testing volumes at 522. The testing volumes are the areas of the testing models that are to be classified as bone, cartilage, or otherwise. The "areas" or "portions" of the MR testing models described herein are intended to refer to 2D areas or 3D volumes.

The system uses pose estimation by marginal space learning at 523 to produce the estimated translation, rotation, and scaling of the model at 524, so that the testing volume corresponds to the mean shape and shape variation space of the active shape model.

The system applies model deformation by iterative boundary fitting, using the estimated translation, rotation, and scaling of the model at 525, by fitting the testing volume to the active shape model according to the mean shape and shape variation space. This produces the initial segmentation at 526.

The initial segmentation is the initial classification of portions of the testing model into bone, cartilage, or other.

The system then performs a random walk process on the model for boundary refinement at 527, using the initial segmentation, to produce the refined segmentation at 528. In this process, the system refines the boundaries of the testing volume with respect to the active shape model. The refined segmentation is the classification of portions of the testing model into bone, cartilage, and other. The system can then store the refined segmentation as a classification data associated with the respective testing model, the classification data identifying the classification or segmentation of each portion of the testing model. This process can also include displaying the MR image testing model including indicating portions of the MR image testing model corresponding to the classification of each voxel. "Receiving" by the system, as used herein, can include loading from storage or receiving from another device or process.

In this embodiment, the whole bone segmentation framework can include three major steps: pose estimation (to determine the estimated translation, rotation, and scaling of the model), model deformation (to properly apply translation, rotation, and scaling of the model), and boundary refinement (to adjust boundaries to fit the testing volume to the active shape model).

Pose Estimation: For a given volume V, the bone is first localized by searching for the optimal pose parameters $(\hat{t}, \hat{r}, \hat{s})$, where $\hat{t}$ represents the translation, $\hat{r}$ represents the rotation, and $\hat{s}$ represents the anisotropic scaling.

$$(\hat{t}, \hat{r}, \hat{s}) = \arg_{t,r,s} \max P(t,r,s|V)$$

To speed up detection, an efficient inference process referred to as marginal space learning (MSL) is employed to decompose the exhaustive search in the original parameter space into three sequential estimation problems each in a lower dimensional marginal space, as represented by:

$$(\hat{t}, \hat{r}, \hat{s}) \approx \arg_t \max P(t|V), \arg_r \max P(r|V, \hat{t}), \arg_s \max P(s|V, \hat{t}, \hat{r})$$

The shape is initialized by linearly transforming the mean shape $\overline{M}$ with estimated pose parameters.

An acceptable MSL process is described in Y. Zheng, A. Barbu, M. Georgescu, M. Scheuring, and D. Comaniciu. Four-Chamber Heart Modeling and Automatic Segmentation for 3D Cardiac CT Volumes Using Marginal Space Learning and Steerable Features. IEEE Trans. Med. Imag., 27(11): 1668-1681, 2008, hereby incorporated by reference. For example, ZHeng describes a MSL process for solving a 9-D similarity transformation search problem for localizing heart chambers. After determining the pose of the heart chambers, this process estimates the 3-D shape through learning-based boundary delineation. This MSL process can incrementally learn classifiers on projected sample distributions by splitting the estimation into three problems: position estimation, position-orientation estimation, and full similarity transformation estimation. Such a method can also use a learning-based 3-D boundary detector to guide the shape deformation in the ASM framework.

Model Deformation: At this stage, the initial shape is deformed to fit the boundary by searching and moving each mesh point $p_i$ ($p_i \in P$) along the normal direction to a new point with the highest probability generated by a set of boundary classifiers. The overall deformation of all mesh points is projected to the variation subspace of the built statistical shape model. This boundary fitting process is repeated several times until convergence.

Boundary Refinement: To further improve the segmentation accuracy, the system uses the random walks process to refine the bone boundary. The anatomical correspondence of mesh points may be lost at this stage. Hence, the system uses the CPD process to register the two sets of mesh points before and after random walks to obtain anatomically equivalent landmarks on the refined bone surface, which will be used to extract distance features as will be described in more detail below.

The system can perform cartilage classification that involves feature extraction, iterative semantic context feature boosting, and post-processing by graph cut optimization. Given all three knee bones being segmented, the system first extracts a band of interest within a maximum distance threshold from each of the bone surface. This can be efficiently achieved by distance transform of binary bone masks in linear time. By classifying only voxels in the band of interest, it not only greatly reduces the computational cost for testing but also simplifies the training by removing irrelevant negative voxels.

Feature Extraction: For each voxel with spatial coordinate x, the system can construct a number of base features which can be categorized into three subsets. Intensity features include the voxel intensity and its gradient magnitude, respectively: $f_1(x) = I(x)$, $f_2(x) = \|\nabla I(x)\|$. Distance features measure the signed Euclidean distances of each voxel to the different knee bone boundaries: $f_3(x) = d_F(x)$, $f_4(x) = d_T(x)$, $f_5(x) = d_P(x)$ where $d_F$ is the signed distance to the femur, $d_T$ to tibia, and $d_P$ to patella. The system also uses the linear combinations:

$$f_6(x) = d_F(x) + d_T(x)$$

$$f_7(x) = d_F(x) - d_T(x)$$

$$f_8(x) = d_F(x) + d_P(x)$$

$$f_9(x) = d_F(x) - d_P(x)$$

These features are useful because the sum features $f_6$ and $f_8$ measure whether voxel x locates within the narrow space between two bones, and the difference features $f_7$ and $f_9$ measure which bone it is closer to. Sum features $f_6$ and $f_7$, in addition to intensity feature $f_1$, separate tibial cartilage from femoral and patellar cartilages.

Given the prior knowledge that the cartilage can only grow in certain area on the bone surface, it is useful for the cartilage segmentation to not only know how close the voxel is to the bone surface, but also where it is anatomically. Therefore, the system uses the following distance features to the densely registered landmarks on the bone surface as described herein:

$$f_{10}(x, \zeta) = \|x - z_\zeta\|$$

where $z_\zeta$ is the spatial coordinate of the $\zeta^{th}$ landmark of all bone mesh points. $\zeta$ is randomly generated in the training of classifiers due to the great number of mesh points available.

Context features compare the intensity of the current voxel x and another voxel x+u with random offset u:

$$f_{11}(x, u) = I(x+u) - I(x)$$

where u is a random offset vector. This subset of features, referred to herein as "random shift intensity difference" (RSID) features, capture the context information in different ranges by randomly generating a large number of different values of u in training. These features can be used to solve pose classification and keypoint recognition problems.

Iterative semantic context feature boosting: Disclosed embodiments can employ a multi-pass iterative classification process to automatically exploit the semantic context for multiple object segmentation problems. In each pass, the generated probability maps will be used to extract the context embedded features to boost the classification performance of the next pass.

Figure 6:
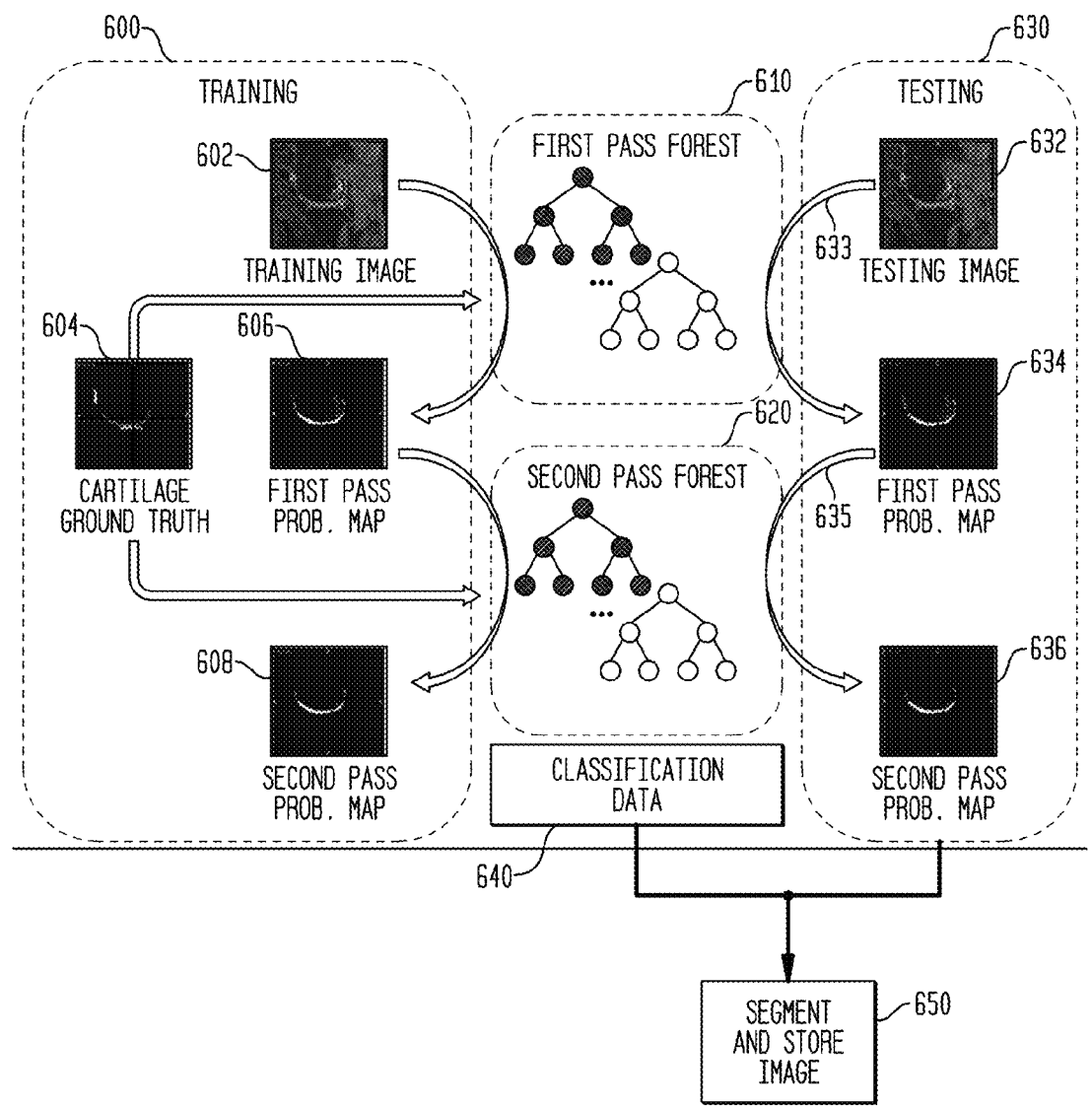
FIG. 6 illustrates a two-pass iterative classification framework in accordance with disclosed embodiments.

FIG. 6 illustrates a two-pass iterative classification process with the random forest selected as the base classifier for each pass, but the method can be extended to more pass iterations with the use of other discriminative classifiers.

This cartilage segmentation process comprises two-stage classifiers, also called two-pass classification. This embodiment includes a training phase 600 and a testing phase 630, which can be performed at the same time or can be performed independently. That is, the training phase 600 can be completed, and its results stored, at one time, and the testing phase 630 can be performed at a later time using the results of the training phase 600.

The training phase 600 is based on comparing a set of training images 602 with the cartilage ground truth information 604 manually annotated in each training image. The training outputs are the first pass random forest classifiers 610 with the selected features, thresholds, class probabilities, and other parameters. The first pass random forest classifiers 610 can be used to produce first pass probability map 606.

The training phase 600 can then include a second pass where the cartilage ground truth information 604 is compared to the first pass probability map 606 to produce the second pass random forest classifiers 620 with the selected features, thresholds, class probabilities, and other parameters. The second pass random forest 620 can be used to produce second pass probability map 608.

During the testing phase 630, for any testing image 632 (any given image of an MR image testing model where there is no ground truth), these random forest classifiers can be used at 633 to automatically classify each voxel in the image into one of the four classes, femoral cartilage, tibial cartilage, patellar cartilage and background (everything else).

More specifically, each testing image is compared to the first pass random forest classifiers 610 at 633 to produce first pass probability map 634, generally of the same size as the input images. The value of each voxel in the first pass probability map 634 indicates the likelihood of this voxel being any of the four classes. Generally, the voxel will be classified as the one of the four classes with the maximum likelihood.

The first pass probability maps 634 obtained by the first pass random forest classifiers 610 can be used by the second pass random forest classifiers 620 at 635 to improve the classification performance. The second pass probability map 636, obtained using the second pass random forest classifiers 620 at 635, can be used as the ultimate class decision, and the system can then store classification data 640, corresponding to the second pass probability map, as associated with the MR image testing model.

Finally, as part of the testing phase 630 or separately, the system can segment each of the testing images at 650. This process can include using the classification data 640 to segment each testing image into different areas, such as general bone areas, cartilage areas, and other or background areas, or specific areas, such as patella areas, patellar cartilage areas, femur areas, femoral cartilage areas, tibia areas, and tibial cartilage areas. This process can include storing this segmentation data with or as part of the classification data, or can include annotating each testing image with the segmentation data, as metadata or otherwise, so that when the image is displayed to a user, the corresponding segmentation data can also be displayed to label or otherwise indicate (such as by color coding) the different segmentation areas. The segmentation of the testing image into different areas can be based on assigning each voxel to a respective areas according to that voxel's classification.

Of course, the system can be extended more than two stages of classifiers, with each stage utilizing the probability map obtained from the previous stage, and the probability map output from the last stage used as the ultimate class decision.

Semantic context features: After each pass of the classification, probability maps are generated and used to extract semantic context features as defined below:

$$f_{12}(x)=P_F(x)$$

$$f_{13}(x)=P_T(x)$$

$$f_{14}(x)=P_P(x)$$

where $P_F$, $P_T$, and $P_P$ stand for the femoral, tibia, and patellar cartilage probability map, respectively. In the same fashion as the RSID features above, the system can compare the probability response of two voxels with random shift $$f_{15}(x,u)=P_F(x+u)-P_F(x)$$

$$f_{16}(x,u)=P_T(x+u)-P_T(x)$$

$$f_{17}(x,u)=P_P(x+u)-P_P(x)$$

which is called random shift probability difference features (RSPD), providing semantic context information because the probability map values are directly associated with anatomical labels, compared to the original intensity volume.

In such a multi-pass classification system, the probability map of each subsequent pass shows a quantitative improvement with a less noisy response.

Post processing by graph cut optimization: After the multi-pass iterative classification, the system can use the probabilities of the four classes, background, femoral, tibial, and patellar cartilage, to construct the energy function and perform the multi-label graph cut to refine the segmentation result with smoothness constraints. An acceptable graph cut process is described in Y. Boykov, O. Veksler, and R. Zabih. *Fast Approximate Energy Minimization via Graph Cuts*, IEEE Transactions on Pattern Analysis and Machine Intelligence, 23(11):1222-1239, November 2001, hereby incorporated by reference. For example, Boykov describes processes based on graph cuts that efficiently find a local minimum with respect to expansion moves and swap moves. These moves can simultaneously change the labels of arbitrarily large sets of pixels. Such a process finds a labeling within a known factor of the global minimum and handles general energy functions. These processes allow important cases of discontinuity-preserving energies.

The graph cut algorithm assigns a label l(x) to each voxel x and a label l(y) to a voxel y, such that the energy E below is minimized:

$$E(L) = \sum_{\{x,y\}\in N} V_{x,y}(l(x), l(y)) + \sum_x D_x(l(x))$$

where L is the global label configuration, N is the neighborhood system, $V_{x,y}(\square)$ is the smoothness energy, and $D_x(\square)$ is the data energy. The system defines $$D_x(l(x)) = -\lambda \ln P_{l(x)}(x),$$

$$V_{x,y}(l(x), l(y)) = \delta_{l(x)\neq l(y)} e^{\frac{(I(x)-I(y))^2}{2\sigma^2}}.$$

$\delta_{l(x)\neq l(y)}$ takes value 1 when l(x) and l(y) are different labels, and takes value 0 when l(x)=l(y). $P_{l(x)}(x)$ takes the value $P_F(x)$, $P_T(x)$, $P_P(x)$ or $1-P_F(x)-P_T(x)-P_P(x)$, depending on the label l(x). $\lambda$ and $\sigma$ are two parameters. $\lambda$ specifies the weight of data energy versus smoothness energy, while $\sigma$ represents the image noise.

Of course, those of skill in the art will recognize that, unless specifically indicated or required by the sequence of operations, certain steps in the processes described above may be omitted, performed concurrently or sequentially, or performed in a different order. Various features and processes of embodiments described herein may be combined with each other within the scope of this disclosure.

Those skilled in the art will recognize that, for simplicity and clarity, the full structure and operation of all data processing systems suitable for use with the present disclosure is not being illustrated herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for classifying bone and cartilage in a magnetic resonance (MR) images, comprising:
   receiving, in a data processing system, an MR image testing model, the testing model including unclassified bone and cartilage portions;
   determining, by the data processing system, a testing volume of the testing model, the testing volume including areas of the testing model to be classified as bone or cartilage;
   modifying the testing model, by the data processing system, so that the testing volume corresponds to a mean shape and a shape variation space of an active shape model;
   producing an initial classification of the testing volume into bone areas and cartilage areas, by the data processing system, by fitting the testing volume to the mean shape and the shape variation space of the active shape model;
   producing a refined classification of the testing volume into bone areas and cartilage areas, by the data processing system, by refining the boundaries of the testing volume with respect to the active shape model; and
   segmenting the MR image testing model into different areas corresponding to bone areas and cartilage areas according to the refined classification.

2. The method of claim 1, further comprising:
   receiving a plurality of training volumes, the training volumes including known areas of bone and cartilage;
   performing a coherent point drift (CPD) process to produce correspondence meshes that each correspond to a respective each training volume;
   performing a principal component analysis (PCA) process to produce PCA models from the correspondence meshes; and
   producing the active shape model from the PCA models.

3. The method of claim 2, wherein the CPD process includes performing a point-set registration on the training volumes.

4. The method of claim 1, wherein modifying the testing model includes applying a model deformation to the testing model, the model deformation including translation, rotation, and scaling of the testing model.

5. The method of claim 1, wherein the data processing system uses pose estimation by marginal space learning to produce estimated translation, rotation, and scaling required for the modification of the testing model.

6. The method of claim 1, wherein refining the boundaries of the testing volume with respect to the active shape model includes performing a random walk process.

7. The method of claim 1, wherein the MR image testing model is an MR image of a human knee.

8. The method of claim 1, wherein segmenting the MR image testing model into different areas corresponding to bone areas and cartilage areas, includes segmenting the MR image testing model into a patella area, a patellar cartilage area, a femur area, a femoral cartilage area, a tibia area, and a tibial cartilage area.

9. The method of claim 1, wherein the data processing system annotates the MR testing image model with segmentation data corresponding to the different areas.

10. The method of claim 1, wherein the data processing system displays the MR image testing model including indicating the different areas on the MR image testing model.

11. A method for classifying bone and cartilage in a magnetic resonance (MR) images, comprising:
    receiving, in a data processing system, an MR image testing model, the testing model including unclassified bone and cartilage portions represented by a plurality of voxels;
    performing a first classification process, by the data processing system, using first pass random forest classifiers to produce a first pass probability map that classifies each voxel of the testing model as one of femoral cartilage, tibial cartilage, patellar cartilage, or background;
    performing a second classification process, by the data processing system, using second pass random forest classifiers to produce a second pass probability map that classifies each voxel of the first pass probability map as one of femoral cartilage, tibial cartilage, patellar cartilage, or background;
    storing classification data in the data processing system, corresponding to the second pass probability map, as associated with the MR image testing model and indicating the classification of each voxel; and
    displaying the MR image testing model including indicating portions of the MR image testing model corresponding to the classification of each voxel.

12. A data processing system, comprising:
    a processor; and
    an accessible memory, the data processing system configured to
    receive an MR image testing model, the testing model including unclassified bone and cartilage portions;
    determine a testing volume of the testing model, the testing volume including areas of the testing model to be classified as bone or cartilage;
    modify the testing model so that the testing volume corresponds to a mean shape and a shape variation space of an active shape model;
    produce an initial classification of the testing volume into bone areas and cartilage areas;

produce a refined classification of the testing volume into bone areas and cartilage areas by refining the boundaries of the testing volume with respect to the active shape model; and segment the MR image testing model into different areas corresponding to bone areas and cartilage areas according to the refined classification.

13. The data processing system of claim 12, wherein the data processing system is further configured to receive a plurality of training volumes, the training volumes including known areas of bone and cartilage;

perform a coherent point drift (CPD) process to produce correspondence meshes that each correspond to a respective each training volume;

perform a principal component analysis (PCA) process to produce PCA models from the correspondence meshes; and produce the active shape model from the PCA models.

14. The data processing system of claim 13, wherein the CPD process includes performing a point-set registration on the training volumes.

15. The data processing system of claim 12, wherein modifying the testing model includes applying a model deformation to the testing model, the model deformation including translation, rotation, and scaling of the testing model.

16. The data processing system of claim 12, wherein the data processing system uses pose estimation by marginal space learning to produce estimated translation, rotation, and scaling required for the modification of the testing model.

17. The data processing system of claim 12, wherein refining the boundaries of the testing volume with respect to the active shape model includes performing a random walk process.

18. The data processing system of claim 12, wherein the MR image testing model is an MR image of a human knee.

19. The data processing system of claim 12, wherein segmenting the MR image testing model into different areas corresponding to bone areas and cartilage areas, includes segmenting the MR image testing model into a patella area, a patellar cartilage area, a femur area, a femoral cartilage area, a tibia area, and a tibial cartilage area.

20. The data processing system of claim 12, wherein the data processing system annotates the MR testing image model with segmentation data corresponding to the different areas.

21. The data processing system of claim 12, wherein the data processing system displays the MR image testing model including indicating the different areas on the MR image testing model.

22. A data processing system, comprising:
a processor; and
an accessible memory, the data processing system configured to
receive an MR image testing model, the testing model including unclassified bone and cartilage portions represented by a plurality of voxels;
perform a first classification process using first pass random forest classifiers to produce a first pass probability map that classifies each voxel of the testing model as one of femoral cartilage, tibial cartilage, patellar cartilage, or background;
perform a second classification process using second pass random forest classifiers to produce a second pass probability map that classifies each voxel of the first pass probability map as one of femoral cartilage, tibial cartilage, patellar cartilage, or background;
store classification data, corresponding to the second pass probability map, as associated with the MR image testing model and indicating the classification of each voxel; and
display the MR image testing model including indicating portions of the MR image testing model corresponding to the classification of each voxel.

* * * * *